UNITED STATES PATENT OFFICE.

ERIK LIEBREICH, OF BERLIN, GERMANY.

METHOD OF PROTECTING FLOATING BODIES AGAINST ADHERING OF MUSSELS.

1,043,051.  Specification of Letters Patent.  Patented Oct. 29, 1912.

No Drawing.  Application filed August 8, 1912. Serial No. 714,037.

*To all whom it may concern:*

Be it known that I, ERIK LIEBREICH, a citizen of the German Empire, residing at Berlin, Germany, have invented certain new and useful Improvements in Methods of Protecting Floating Bodies Against Adhering of Mussels, of which the following is a specification.

My invention relates to a method of protecting floating bodies against adhering of mussels and other aquatic animals and consists in providing the floating bodies with a paint coating which has the property of slowly setting free alkaline lyes or solutions in presence of water or moisture. A suitable material for this purpose is a paint somewhat similar to that described in my German Patent 203,957. The effect of preventing the mussels from adhering to the floating bodies may possibly depend on the fact, that the alkaline lyes or solutions if set free from the paint in presence of water or moisture prevent the keratin contained in the secretion of the mussels and used as a cement for securing adhesion from hardening. This paint proves especially effective in this respect, since it contains a substance not only capable of producing the necessary alkaline solution in the presence of water, but containing nitrogen as well, which upon decomposition with water yields an amido compound, *e. g.*, ammonia, which is repulsive to mussels and other aquatic animals. Among these substances the paints containing amids including cyanamids of alkalis have proved especially effective. I wish to be understood, that "amids of alkalis" in this connection is used so as to comprise at the same time the amids of alkalis proper and of earthly alkalis.

In order to secure the desired effect it is necessary to use the paint coating as exterior coating which is in immediate contact with water. This paint coating is practically applied to surfaces which are not subjected to corrosion by oxidation. So care must be taken, that the floating bodies are first provided with a coating protecting against rusting, and then with an indifferent coating, and finally with a coating which in accordance with this invention has the property of slowly setting free alkaline lyes or solutions and which by this property is adapted to prevent the adhesion of mussels. An especially suitable paint for this purpose is obtained in the following manner: White lead is mixed with boiled linseed oil in the proportions of 23 parts by weight of white lead, 6 parts by weight of linseed oil with continuous stirring, a small quantty of "vine black" being added, if a grayish paint is to be manufactured. While still stirring, perfectly dry sodamid is added to the cold mass in the proportion of say 0.2 grams to every 10 grams of the mass. The amount of alkali and the special kind of the alkali added may be varied within wide limits.

It is evident that alkaline-earth amids are the equivalent of alkaline amids, and I wish to be understood that the term "alkali" is intended to include the alkaline-earth hydroxids.

What I claim is:

1. The method of protecting floating bodies against adhesion of mussels and other aquatic animals, consisting in coating the same with an antirust paint and then with a paint capable of reacting with water to set free alkaline lyes or solutions.

2. The method of protecting floating bodies against adhesion of mussels and other aquatic animals, consisting in coating the same with an antirust paint and then with a paint containing amids of alkalis.

3. An article provided with an exterior coating containing a compound capable of reacting with water to set free an alkali.

4. An article provided with an exterior coating containing an amid setting free alkali in the presence of water.

5. An article provided with an exterior coating containing sodamid setting free alkali in the presence of water.

6. An article provided with an exterior coating containing an amid in quantity less than five per cent. by weight.

7. An article provided with an exterior coating containing sodamid in quantity less than five per cent. by weight.

In testimony whereof I affix my signature in presence of two witnesses.

ERIK LIEBREICH.

Witnesses:
 WOLDEMAR HAUPT,
 HENRY HASPER.